United States Patent [19]

Buglewicz

[11] 4,198,544
[45] Apr. 15, 1980

[54] TAPE HEAD CONTROL ARRANGEMENT

[75] Inventor: Neal J. Buglewicz, Rolling Hills Estates, Calif.

[73] Assignee: Phone-Mate, Inc., Torrance, Calif.

[21] Appl. No.: 850,419

[22] Filed: Nov. 10, 1977

[51] Int. Cl.$^2$ .................. H04M 1/64; G11B 5/55; G11B 21/08
[52] U.S. Cl. ............................ 179/6 R; 360/106; 360/78
[58] Field of Search ................ 179/6 R; 360/106, 78

[56] References Cited

U.S. PATENT DOCUMENTS

| | | | |
|---|---|---|---|
| 2,937,237 | 5/1960 | Zanardo | 179/6 AC |
| 3,590,159 | 6/1971 | Wolf | 179/6 R |
| 3,865,987 | 2/1975 | Yamamoto | 360/106 |
| 3,967,068 | 6/1976 | Shinohara | 360/106 |

Primary Examiner—Bernard Konick
Assistant Examiner—Alan Faber
Attorney, Agent, or Firm—Don B. Finkelstein

[57] ABSTRACT

A tape head control arrangement for a telephone answering machine. The outgoing message is recorded on the first track of a recirculating multi-track tape. The record-playback tape head is movable over the plurality of available tracks on the tape. Movement of the tape head is controlled by a cam connected to a rachet which is rotated by a solenoid in discrete steps, each step corresponding to movement of the tape head to the next available track. When no incoming calls have been received the tape head is positioned at track two of the tape in a standby mode of operation. When the first incoming call is received the solenoid is automatically actuated and a control arrangement moves the tape head to the first track to play the outgoing message. At the conclusion of the outgoing message corresponding to a complete circuit of the tape the solenoid is deactivated and the cam allows movement of the tape head back to the second track for the record mode of operation. On each succeeding call the tape head control always moves the tapehead first to the number one track to play the outgoing message and the cam control allows the tape to move sequentially to the next unused track. When all available tracks have been used a disable mechanism renders the arrangement non-responsive to further incoming calls.

19 Claims, 6 Drawing Figures

TAPE HEAD CONTROL ARRANGEMENT

BACKGROUND OF THE INVENTION

1. Field of the Invention

This invention relates to the tape head control art and more particularly to an improved tapehead control for an inexpensive automatic telephone answering and playback arrangement.

2. Description of the Prior Art

Automatic telephone answering and playback mechanisms are now widely utilized to allow first the playing of an outgoing message to the incoming caller and then the automatic recording of incoming messages. However, in many of the prior art single tape deck devices the messages were recorded sequentially on the tracks of a recirculating tape with the outgoing message repetitively recorded, so that it was played prior to recordation of each incoming call. This made it difficult for the play back of a particular incoming call message without listening to the repetitions of the outgoing message.

In still many other prior art devices the telephone answering and playback machines incorporated two separate recirculating tapes and tape heads. The outgoing message was recorded on one of the recirculating tapes and all incoming messages recorded on other recirculating tapes with separate tape heads, tape drives and associates equipment utilized for each tape. Automatic controls were utilized to control the separate tape heads so that the outgoing message recorded on the first tape was first played in response to each incoming call and then the incoming message recorded on the second tape. While such arrangements provided the ability to replay incoming recorded messages in sequence without the necessity of repetitively listening to the outgoing recorded message between each incoming message, the provision of two separate tape decks and associated controls added considerably to the cost of such machines.

Thus, there has long been a need for an automatic telephone answering and playback arrangement utilizing a single multi-track tape on which the outgoing message is recorded and first played to each caller and then the tape head automatically sequenced to the record mode and to the next available track for recording the incoming message. This allows rapid and convenient playback capability without the necessity of listening to the outgoing recorded message between each incoming message and reduces the cost of the machine by eliminating one complete tape deck therefrom.

SUMMARY OF THE INVENTION

Accordingly, it is an object of the present invention to provide an improved mechanism for automatic telephone answering machines.

It is another object of the present invention to provide an improved telephone answering meachine utilizing a single multi-track, recirculating tape on which a recorded message is first played and incoming messages are sequentially recorded.

It is another object of the present invention to provide an improved telephone answering machine utilizing a single multi-track recirculating tape and a single tape head in which each incoming message commences on the next available track.

It is still a further object of the present invention to provide an improved telephone answering arrangement utilizing a single multi-track recirculating tape in which the playing of the recorded message precedes the indexing of the tape head to the next available track for recording of an incoming message and playback of the recorded messages may be achieved without listening to the recorded outgoing message.

In the description of the invention herein reference is made to utilization of an 8-track tape in the improved telephone answering machine of the present invention. However, the invention is not limited to an 8-track tape but may be utilized on tapes having any number of available tracks thereon. Therefore, the specific structure described and set forth herein are for illustrative purposes only in setting forth the best mode for utilizing the invention utilizing commonly available tape widths. The invention is limited only by the appended claims.

The objects set forth above are achieved, according to a preferred embodiment of the present invention by providing a multi-track tape such as, for example, an 8-track recirculating tape, and a single record-playback tape head which is automatically positioned to specific tracks on the tape in a predetermined sequence of operation. The outgoing message is recorded on the first or uppermost track of the tape. After playing the outgoing message the tape head is indexed to the second track. Movement of the tape head over the plurality of tracks is uniquely controlled according to the principles of the present invention. Movement of the tape head to adjacent tracks is accomplished by a cam rotated by a ratchet, each step of the cam indexing the tape head to the next adjacent track. The ratchet is moved by an actuating arm of a solenoid. The ratchet has a number of teeth corresponding to one less than the total number of tracks and is equal to the number of tracks for recording incoming messsages provided on the tape. For the example selected, with an 8-track tape the number of ratchet teeth comprises 7. In the standby mode, that is, when the outgoing message has been recorded on track one and the telephone answering maching is waiting to receive its first incoming message, the cam positions the tape head at track number two. When an incoming telephone call is received, the solenoid controlling the cam is energized rotating the ratchet and the cam and the tape head is first positioned on the number one track to play the outgoing message and then automatically positioned by the cam onto track two to record the first message. Thereafter, each succeeding incoming call causes actuation of the solenoid to cause rotation of the cam causing the tape head to move to the next available track on the tape after playing the outgoing message.

Each actuation of the solenoid thus actuates the tape head control mechanism which initially moves the tape head to track one to allow playing of the recorded outgoing message. As the conclusion of the outgoing message the tape head control automatically causes the tape head to move to the track position defined by the cam profile.

A detent retains the ratchet after actuation by the solenoid and thus retains the cam in the exact position during recording of each incoming message.

Each succeeding incoming call causes actuation of the solenoid and the solenoid actuation first moves the tapehead to track one and also rotates the ratchet one step which for an 8-track tape is 45°. Thus, the tapehead is automatically indexed by the cam profile and each succeeding call is placed on the next available track for recording. The control arrangement for positioning the tape head to play the recorded message to the incoming caller is actuated in the identical fashion for each succeeding incoming call and the cam profile allows the tape head, after the conclusion of the outgoing message, to move to the next available track.

When all available tracks have been utilized for incoming messages a disable switch is engaged to prevent the machine from responding to additional calls, thus preventing recording over and/or erasing the last recorded message. Since there are eight available tracks on the tape, in this preferred embodiment of the present invention, the ratchet teeth are spaced 45° apart, except for the last position where there is no ratchet tooth. Similarly, in the first recorded message track, which is track two of the tape, the cam profile is equivalent to 90° of ratchet rotation so that after the initial rotation provided by the first call and playing the recorded message, the tape head is still positioned at track two, thereby allowing the control arrangement for indexing the head to the first track to operate identically for each incoming call.

An indicator means may be coupled to the ratchet and cam structure to indicate which track the tape head is on and a manual reset is provided which disengages the solenoid actuator arm from the ratchet to allow rotation of the ratchet and cam in either direction to any desired track on the tape. The indicator reads "0" for the tape head positioned at track two which indicates that no incoming messages have been received. Each successive position at the tape head on the track causes the indicator to show one more incoming call having been received. This indicating arrangement is uniquely provided by having the first cam face occupy twice the angular extent of each other cam face.

BRIEF DESCRIPTION OF THE DRAWINGS

The above and other embodiments of the present invention may be more fully understood from the following detailed description taken together with the accompanying drawings wherein similar reference characters refer to similar elements throughout and in which.

DESCRIPTION OF THE PREFERRED EMBODIMENTS

Figure 1:
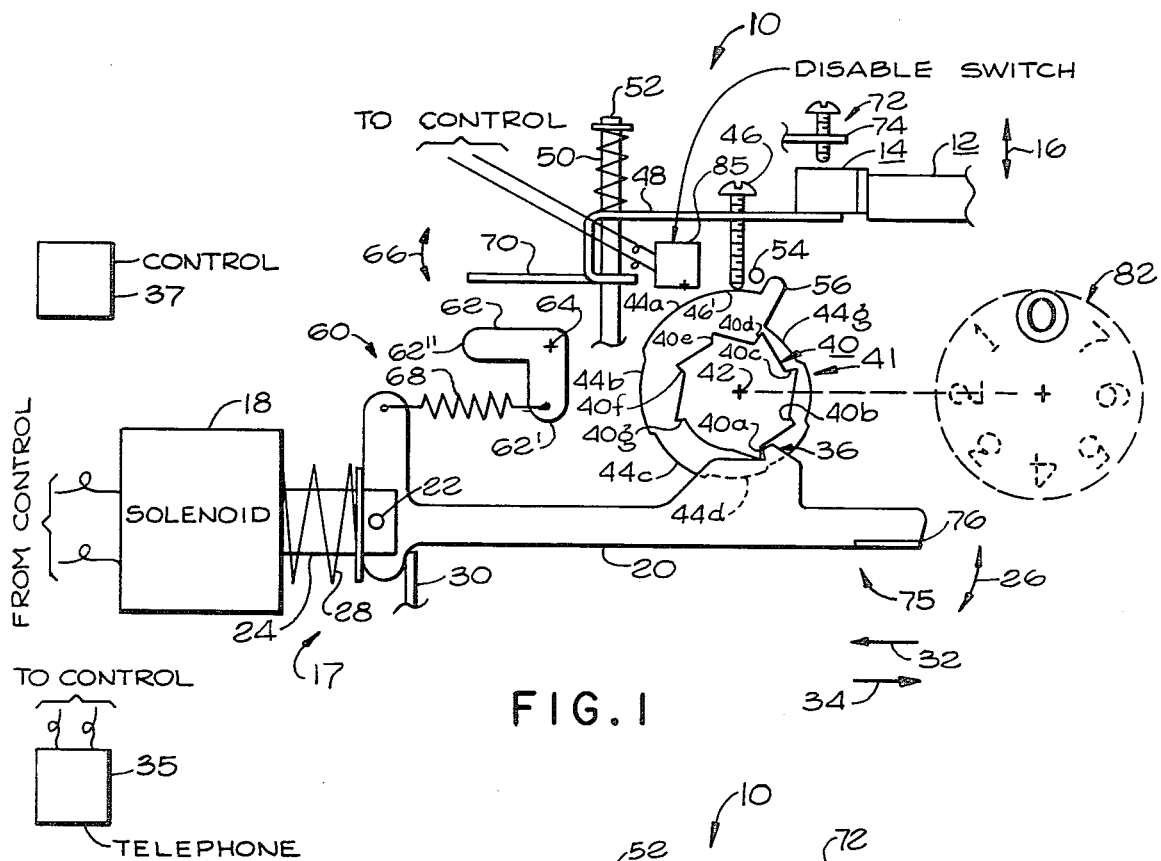
FIG. 1 illustrates the tape head control arrangement of the present invention in "standby mode" awaiting to receive the first incoming call.

Referring now to the drawing there is illustrated in FIG. 1 a preferred embodiment generally designated 10 according to the principles of the present invention. As shown thereon there is a multi-track recirculating tape 12 upon which an outgoing message to be played to each incoming caller is recorded and upon which each incoming caller may have recorded an individual message. By way of example, the multi-track tape 12 may be an 8-track tape and the structure for controlling the tape head control arrangement described herein is illustrated for such an 8-track tape.

A record and playback tape head 14 is provided. The record and playback tape head 14 may be of conventional design and neither the recirculating tape 12 nor the record and playback tape head 14, per se, form the present invention. The tape head control arrangement illustrated on FIG. 1 shows the structure in the position when it is awaiting receipt of the first incoming call. The outgoing message has already been recorded on the first track of the tape 12 and the tape head 14 is positioned at the second track on multi-track tape 12. The tape head 14 moves in relationship to the multi-track 12 in the directions indicated by the arrow 16.

Movement of the tape head 14 in the directions indicated by the arrow 16 are controlled by the structural arrangements hereinafter described.

A drive means generally designated 17 is comprised of a solenoid 18 which provides the primary movements for actuating the control arrangement and has a solenoid plunger 24. The solenoid 18 is connected to another structure of the drive means 17 comprising a solenoid actuator arm 20 by a pivot pin 22 extending through the solenoid actuator arm 20 and the solenoid plunger 24 to allow rotational movement, for purposes hereinafter described, of the solenoid actuator arm 20 in directions indicated by the arrow 26. In FIG. 1 the solenoid 20 is shown in the de-energized, extended condition and is biased into the de-energized extended condition by solenoid spring 28 which resiliently resists motion of the actuator arm in the energized or retract direction indicated by arrow 32. When the solenoid 18 is energized, the solenoid actuator arm 20 moves in a direction indicated by the arrow 32 and, upon de-energization, the solenoid actuating arm 20 is moved in a direction indicated by the arrow 34 under the urging of solenoid spring 28. The solenoid 18 is controlled by the ringing voltage generated in a telephone 35 by an incoming call signal through a control 37. The telephone 35 and the control signal generating mechanism 37 for controlling the solenoid 18 are of conventional design and are not shown herein.

The drive means 17 is further comprised of a stop means 30 which limits the extended travel of the actuator arm 20 to the position shown in FIG. 1.

The actuator arm 20 has ratchet engaging pawl means 36 thereon near the outer end 20a thereof. The solenoid spring 28 yieldingly urges the actuator arm 20 into the position wherein the pawl 36 of actuator arm 20 engages one of the ratchet teeth 40a, 40b, 40c, 40d, 40e, 40f or 40g of a ratchet 40 mounted for rotational movement about a first axis 42. As can be seen from FIG. 1, when the solenoid 18 is energized, actuatory arm 20 retracts and rotates ratchet 40 45° in a clockwise direction. The number of ratchet teeth 40a–40g is one less than the total number of tracks on tape 12, for reasons hereinafter set forth. The angular spacing between the ratchet teeth 40a–40g about axis 42 is equal except for the spacing between first tooth 40a and last tooth 40g which is twice the equal angular spacing. Thus, for an 8-track tape 12, the equal angular spacing is 45° and the angular spacing between teeth 40a and 40g is 90°.

The ratchet 40 forms part of a second motion producing means generally indicated at 41, which is operatively connected to drive means 17 and which also includes a cam means 44 having a plurality of cam faces 44a, 44b, 44c, 44d, 44e, 44f and 44g. The total number of cam faces 44a–44g is one less than the number of tracks on tape 12. The cam 44 is coupled to and rotates with ratchet 40. The angular measurement of each cam face 44b–44g is equal and the angular measurement of cam face 44a is twice this equal angular measurement, all measured about first axis 42. Thus, for an 8-track tape 12 there are seven cam faces 44a–44g and the equal angular measurement is 45° and cam face 44a measures 90°.

The second motion producing means 41 is also operatively connected to the tapehead 14 and comprises a cam follower 46 which may take the form of a screw means threadengly engaging arm 48 which is connected to the tape head 14. The second end 46' of cam follower 46 sequentially engages the cam faces 40a–40g as ratchet 40 is rotated about first axis 42 by actuator arm 20. Second resilient means 50 which is mounted on fixed post 52 resiliently urges cam follower 46 into engagement with cam 44. The threading engagement of cam follower 46 with arm 48 allows positional adjustment of the biasing force exerted by second resilient means 50.

A stop means 54 is positioned to engage extension 56 of cam 44 to limit the rotational movement thereof, in the counter clockwise direction to the position shown on FIG. 1.

A first motion producing means generally designated 60 is also operatively connected to drive means 17 and tape head 14. The first motion producing means 60 is comprised of a crank means 62 mounted for rotational movement about second axis 64 in directions indicated by arrow 66. The crank 62 has a first end 62' connected by third resilient means 68 to actuator arm 20 and is positioned in a rest position shown on FIG. 1.

Figure 2:
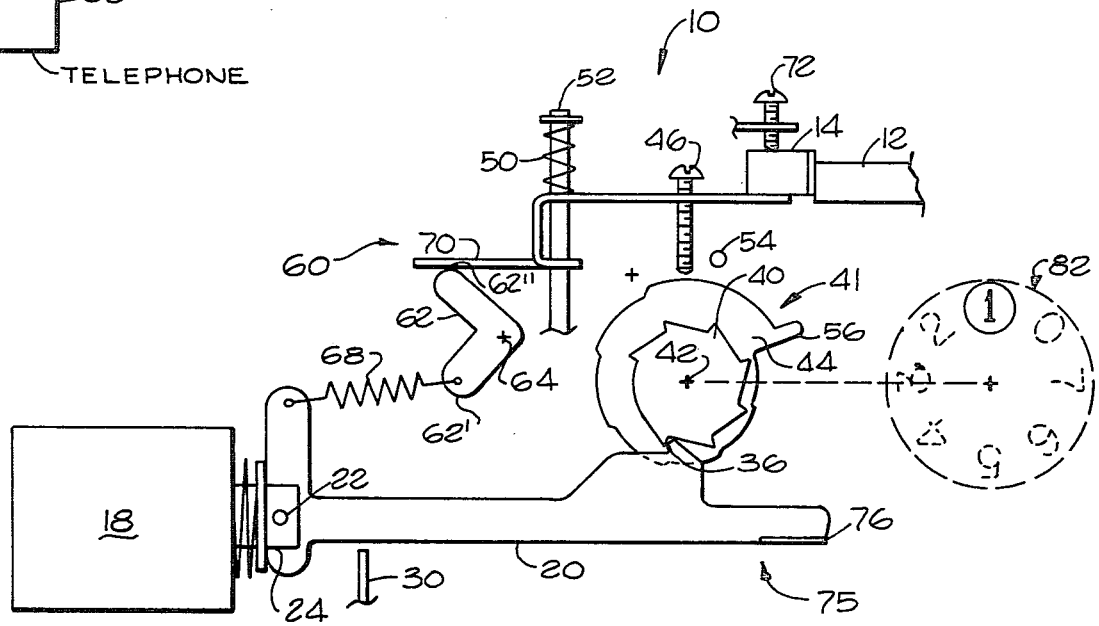
FIG. 2 illustrates the tape head control arrangement in the position for playing the outgoing recorded message to a caller.

When solenoid 18 is energized and actuator arm 20 is retracted, as shown on FIG. 2, crank means 62 is rotated until second end 62" engages lever 70 which is coupled to arm 48 for movement therewith, and thus moves tape head 14 upwardly to the first track position on multi-track tape 12 upon which track is recorded the message sent out to the caller.

Limit means 72 is provided adjacent tape head 14 to control the upward movement of tape head 14 to insure correct positioning on track one. Limit means 72 is preferably adjustable such as being a screw threadingly engaging fixed bracket 74 so that precise adjustment thereof may be accomplished.

Thus, when solenoid 18 is energized first motion producing means 60 is actuated and tape head 14 is moved upwardly until it engages limit means 72. Since movement of the crank 62 is provided through third resilient means 68, positive positioning of tape head 14 with respect to tape 12 is achieved by limit means 72 without necessity of precision fit parts. That is any amount of "over travel" of plunger 24 after tape-head 14 engages limit means 72 in the retract direction of arrow 32 is automatically absorbed by third resilient means 68.

Figure 5:
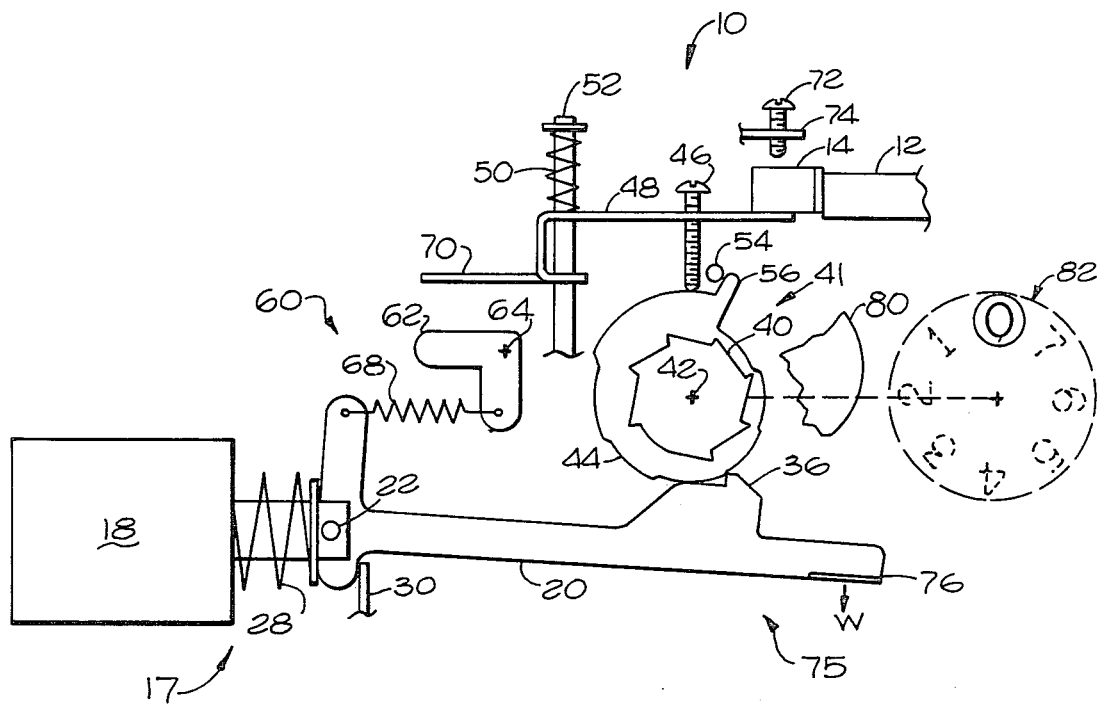
FIG. 5 illustrates the tape head control arrangement in the manual reset condition.

A manual reset means generally designated 75 comprises the pivot pin 22 and a tab means 76 on actuator arm 20 to allow manual rotational movement of actuator arm 20 until pawl 36 is free of engagement with ratchet teeth 40a–40g, as shown on FIG. 5. A knob means 80 is coupled to ratchet 40 and cam 44 to allow free rotation thereof when actuator arm 20 is free of engagement with ratchet 40. An indicator means 82 is also mounted for rotational movement about first axis 42 with cam 44 and ratchet 40. The indicator means 82 has numbers from 0 to 7 thereon corresponding to cam faces 44a–44g, respectively. The "0" indication shows that no incoming messages have been received. Numerals "1"–"7" indicate that, respectively, one through seven incoming calls have been received. Rotation of knob 80 allows manual positioning of tape head 14 at any desired track 2 through 8 of tape 12 so that the messages recorded thereon may be replayed.

The circuitry for switching from "playback" to "record" mode is of conventional design and is not shown herein.

A detent means (not shown) may also be provided, if desired, for the yieldingly retaining cam means 44 in each of its allowable positions. The detent may be of conventional design.

Operation of the embodiment 10 as shown on FIGS. 1 through 5 is as follows. In the position shown in FIG. 1, as noted above, the pre-recorded message for sending out to the incoming callers has already been recorded on the first track of the multi-tract tape 12 and cam follower 46 is urged into engagement with cam face 44a by second resilient means 50. Pawl 36 engages ratchet tooth 40a and the tape head 14 is positioned at the second track of tape 12. When an incoming telephone call is received, solenoid 18 is initially actuated, retracting actuator arm 20 which rotates the ratchet 40 in the clockwise direction and also rotates cam 44. However, upon the solenoid 18 being energized, crank 62 is rotated about axis 64 until end 62" engages lever 70, as shown in FIG. 2, thereby lifting tape head 14 against the yielding resistance of second resilient means 50 until the tape head 14 is aligned with the first track on the tape 12. At this position, the tape head 14 engages the stop means 72. The circuitry (not shown) provides that the tape head 14 is switched to the play back mode of operation and remains in this position shown in FIG. 2 until the recorded message has been completed and tape 12 has completed one complete rotation.

Figure 3:
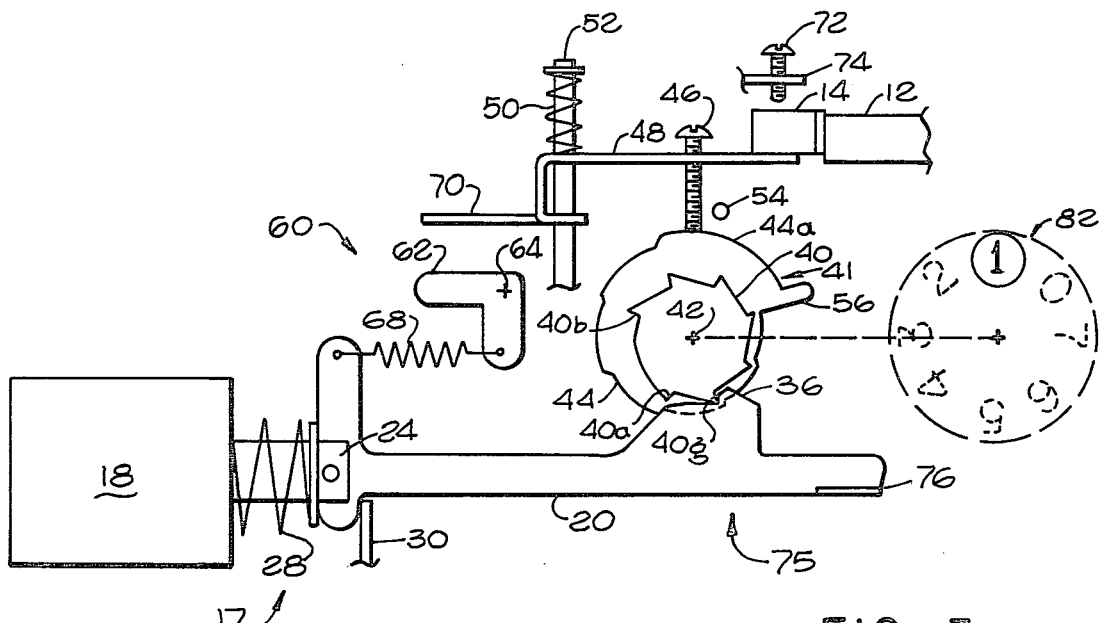
FIG. 3 illustrates the tape head control arrangement in the record position for the first message to be recorded.

FIG. 3 illustrates the position of the embodiment 10 after the completion of playing the recorded message from track one and the solenoid 18 has been de-energized. The actuator arm 20 has rotated the ratchet 40 45° corresponding to the equal spacing of the ratchet teeth 40a–40g and engages the second tooth which, as shown, is 40b. However, since the first cam face 44a is a double angular space, that is, twice the angular measurement of each of the cam faces 44b through 44g, the cam follower 46 still engages the cam face 44a and therefore the tape head 14 is again positioned at the second track level on tape 12 to allow the incoming caller to record his message thereon. The embodiment 10 remains in the position shown in FIG. 3 after the completion of the first recorded message and prior to the solenoid 18 being re-energized by the next call. As can be seen, the indicator 82 shows one incoming call having been received since ratchet 40 has been rotated through 45°. However, because cam face 44a is a "double space," tape head 14 is still positioned at track two. When the solenoid 18 is enenergized by the next call, the actuator arm 20 is again retracted by the solenoid 18 which causes the tape head 14 to be moved upwardly by the first motion producing means 60 to the first track position on track 12 for playing of the recorded message again. The actuation of the solenoid 18 also causes the actuator arm 20 to rotate the ratchet 40 until the pawl 36 engages the next tooth 40c. When the next successive incoming call has caused the ratchet 40 to be rotated until the pawl 36 engages the ratchet tooth 40c, the cam follower 46 then bears against the cam face 44b under the urging of resilient means 50. Since the cam faces 44a through 44g are portions of concentric circles about the first axis 42, with cam face 44a being the largest diameter and the diameter decreasing a predetermined amount corresponding to the track spacing on track 12 for each succeeding cam face 44b–44g, the tape head 14 is then positioned at the third track on tape 12 and the second caller may then record his message on the third track.

Figure 4:
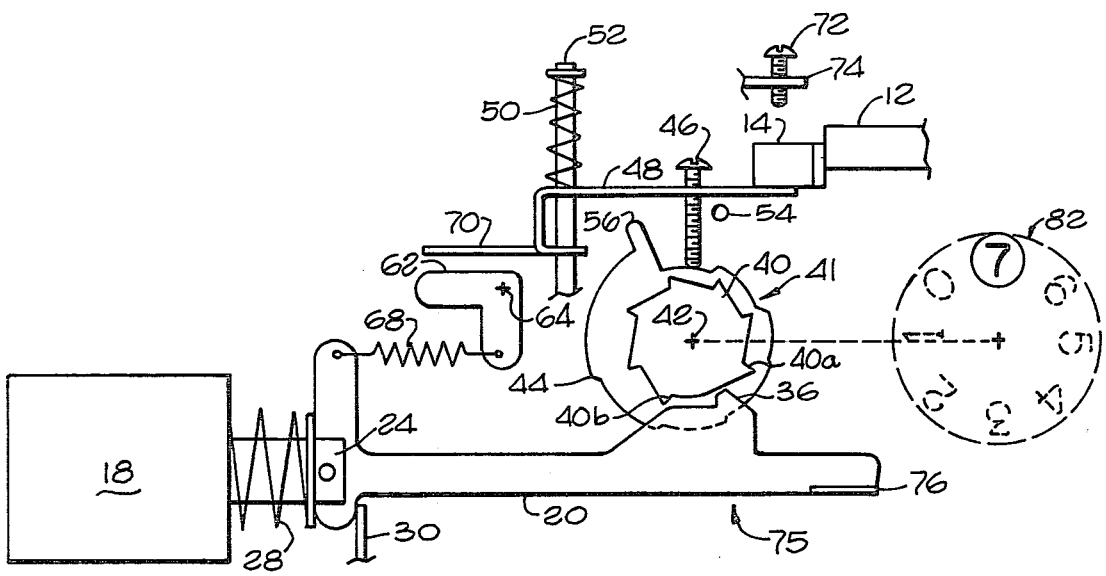
FIG. 4 illustrates the tape head control arrangement indexed to the position for recording the last recorded call.

This sequential operation continues until the seventh incoming call has been received and recorded and this is the position shown in FIG. 4. As noted above, the spacing between ratchet tooth 40a and 40g is twice the spacing of the angular spacing of ratchet teeth 40b through 40g, therefore there is no further rotation of the ratchet 40 since no tooth is present at the correct position for engagement with the pawl 36.

In the position shown in FIG. 4, the extension 56 engages the disabling switch 85 and the disabling switch prevents any further actuation of the embodiment 10 despite further incoming telephone calls received by the telephone by preventing a ring signal from being transmitted from telephone 35 to the solenoid 18.

In FIG. 5 there is illustrated the manual reset mode and, as noted above, the tab 76 is depressed thereby manually rotating the actuator arm 20 about to the pin 22 and disengaging the pawl 36 from the ratchet 40. Knob 80 may then be rotated to any desired position and the indicator 82 shows upon which particular track on tape 12 the tape head 14 is located, as provided by cam follower 46 engaging the various cam faces 44a–44g.

Figure 6:
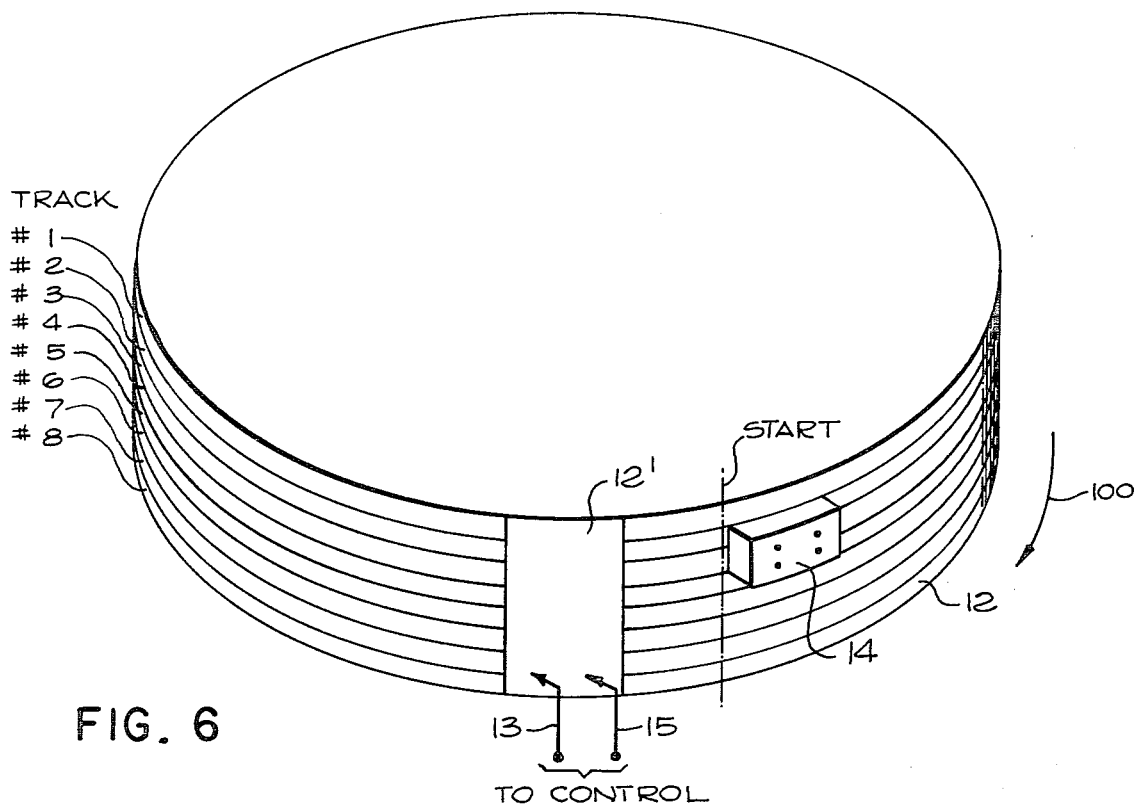
FIG. 6 illustrates an 8-track tape having messages thereon as provided by the tape head control arrangement.

FIG. 6 illustrates the eight track, recirculating tape 12 as utilized in the practice of the present invention. The area indicated at 12' is, for example, metal foil and contacts 13 and 15 provide operative signals to the control (not shown) for operation of the embodiment 10. It will be appreciated that structures other than foil 12' such as holes or the like, as commonly utilized in tapes may be utilized herein.

The outgoing message is recorded on track one and each of seven incoming messages are recorded on tracks two through eight, respectively. The tape moves, with respect to the tape head 14 in the direction indicated by arrow 100 and the outgoing message on track one is played in its entirety. The tape continues rotating until the end of track one when contacts 13 and 15 generate a signal for the control to de-energize the solenoid.

The tape head 14 is then indexed by cam 44 to the next available track for recordation of the incoming signal.

This continues until a message has been recorded on track eight. When the tape 12 makes a complete circuit with the tape head 14 positioned at track eight, that is, the time for recording a message on track eight having elapsed, disable switch 85 having been activated at the beginning of the recordation on track eight by contact with extension 56 on cam 44, further incoming calls do not cause any further operation of the embodiment 10.

In the playback mode, for listening to the recorded messages, at the end of each of the recorded incoming messages on tracks two through eight, the solenoid is only instantaneously energized to rotate the ratchet 40 but then immediately deenergized so that the cam 44 positions the tape head 14 at the next track without playing of the outgoing recorded message between playbacks of the recorded incoming messages. The signals for providing such record, playback and solenoid energizing/de-energizing are provided in a conventional manner.

The purpose of the "double" space between the last ratchet tooth 40g and first ratchet tooth 40a is apparent. After the last recorded message on track eight has been played and foil strip 12' comes into position with contacts 13 and 15, instantaneously energizing of solenoid 18 does not result in any further rotation of ratchet 40 or cam 44.

From the above, it is apparent that there has been provided an improved automatic control for the tape head in a multi-track automatic telephone answering arrangement.

Those skilled in the art may find many variations and adaptations and the appended claims are intended to cover all such variations and adaptations falling within the true scope and spirit of the invention.

I claim:

1. In a tape head control for an automatic telephone answering arrangement for indexing the tape head to predetermined tracks on a multi-track recirculating tape having a plurality of tracks thereon in which an outgoing message is prerecorded on the first track and each individual incoming message is sequentially recorded, one message on each other track, and having a record and playback mode, the improvement comprising, in combination:

first motion producing means operatively connected to the tape head for indexing motion to position the tape head at said first track of the multi-track tape in response to each incoming call for the condition of playing back said outgoing message, and said tape head in the playback mode to play the outgoing prerecorded message to the incoming caller, and said first motion producing means free of operative connection to the tape head for conditions other than playing back said prerecorded message;

second motion producing means operatively connected to the tape head and free of operative interconnection to said first motion producing means, for indexing motion for sequentially indexing the tape head from the second track to each successive track in response to successive incoming calls in the record mode thereof to record an incoming message on the tape, and said second motion producing means including means for positioning said tape head at a predetermined track of said multi-track recirculating tape other than said first track thereof for conditions other than playing back said outgoing message; and drive means operatively connected to said first and said second motion producing means for providing said indexing motions thereof in response to an incoming ring signal from a telephone.

2. The arrangement of claim 1 and further comprising:

disabling means operatively connected to said second motion producing means for preventing said drive means operation for the condition of an incoming message recorded on the last track of said multi-track tape; and reset means operatively connected to said second motion producing means and said drive means for disengagement of said drive means from said second motion producing means and allowing selective movement of said tape head to each of the second and successive tracks on said tape.

3. The improvement of claim 2 wherein said reset means further comprises:
- a pivot pin means for mounting said actuator arm on said plunger means to provide a pivotal connection therebetween for pivotal motion about a third preselected axis;
- tab means on said actuator arm, and manual engagement of said tab means moves said pawl free of ratchet tooth engagement;
- knob means connected to said cam means for allowing selective rotation of said cam means for selective positioning said tape head at said second track and successive tracks of said tape.

4. The improvement of claim 3 wherein said reset means further comprises:
- indicator means coupled to said cam means for indicating the track at which said tape head is positioned.

5. The improvement of claim 1 wherein said drive means further comprises:
- a solenoid having a plunger for moving said plunger in reciprocating directions between a retracted position wherein said solenoid is energized and an extended position wherein said solenoid is de-energized;
- an actuator arm connected to said plunger for reciprocating motion therewith and said actuator arm having a ratchet engaging pawl thereon;
- first resilient means resiliently engaging said actuator arm for urging said actuator arm in the extended condition thereof; and
- stop means for limiting the extended travel of said actuator arm.

6. The improvement of claim 5 wherein said second motion producing means further comprises:
- a ratchet having a plurality of teeth thereon and mounted for rotational movement about a first preselected axis, and said pawl of said actuator arm sequentially engaging said teeth of said ratchet for the condition of movement of said actuator arm into the retracted condition thereof to rotate said ratchet about said first preselected axis;
- cam means connected to said ratchet for rotational movement therewith and having a plurality of cam faces thereon;
- cam follower means connected to said tape head and engaging said cam faces for following the contours thereof to move said tape head to corresponding track positions on said tape.

7. The improvement of claim 6 wherein said second motion producing means further comprises:
- the number of said plurality of teeth on said ratchet means comprises one less than the total number of tracks on said tape; and
- the number of said plurality of cam faces on said cam means comprise one less than the total number of tracks on said tape.

8. The improvement of claim 7 wherein said second motion producing means further comprises:
- the first of said plurality of cam faces corresponding to said tape head positioned at the second track of said tape, and each succeeding cam face corresponds sequentially to said tape head positioned at sequentially succeeding tracks of said tape.

9. The improvement of claim 8 wherein said second motion producing means further comprises:
- the second and each succeeding cam face comprises substantially equal cam arcuate angles around said preselected axis; and the first cam face comprises approximately twice said equal cam arcuate angle;
- the first and each successive ratchet tooth is spaced substantially an equal ratchet arcuate angle from the preceding tooth, and the last tooth is spaced substantially twice said equal ratchet angle from said first tooth.

10. The improvement of claim 9 wherein said disabling means further comprises:
- a switch means for preventing actuation of said drive means in response to a further incoming call signal for the condition of said tape head positioned at the last track of said multi-track tape and time for recording a message thereon having elapsed.

11. The improvement of claim 10 and further comprising:
- second resilient means for yieldingly urging said cam follower into engagement with said cam faces.

12. The improvement of claim 11 and further comprising:
- said cam follower is adjustably mounted with respect to said cam faces of said cam to vary the force exerted by said second resilient means.

13. The improvement of claim 1 wherein said first motion producing means further comprises:
- a crank means mounted for rotational movement about a second preselected axis and having a first end and a second end and movable about said second axis between a rest condition and an engaged condition;
- third resilient means connected to said first end of said crank means and to said drive means;
- lever means connected to said tape head and engaging said second arm of said crank means for moving said tape head to the first track of said tape for said crank means in said engaged condition, and said lever means free of engagement with said second arm of said crank means for said crank means in said rest condition.

14. The improvement of claim 13 wherein said second motion producing means further comprises:
- a solenoid having a plunger for moving said plunger in reciprocating directions from a retracted position wherein said solenoid is energized and an extended position wherein said plunger is extended;
- an actuator arm connected to said plunger for reciprocating motion therewith and said actuator arm having a ratchet engaging pawl thereon;
- first resilient means resiliently engaging said actuator arm for urging said actuator arm in the ended condition thereof;
- stop means for limiting the extended travel of said actuator arm;
- and said first motion producing means further comprises:
- said third resilient means connected to said actuator arm, and said crank in said engaged condition for said actuator arm in said retracted position, and said crank in said rest position for said actuator arm in said extended position thereof.

15. The improvement of claim 14 wherein said second motion producing means further comprises:
- a ratchet having a plurality of teeth thereon and mounted for rotation movement about a first preselected axis, and said pawl of said actuator arm sequentially engaging said teeth of said ratchet for the condition of movement of said actuator arm into the retracted condition thereof to rotate said ratchet about said first preselected axis;

cam means connected to said ratchet for rotational movement therewith and having a plurality of cam faces thereon;

cam follower means connected to said tape head and engaging said cam faces for following the contours thereof, to move said tape head to corresponding track positions on said tape.

16. The improvement of claim 15 wherein:

the number of said plurality of teeth on said ratchet means comprises one less than the total number of tracks on said tape; and the number of said plurality of cam faces on said cam means comprising one less than the total number of tracks on said tape.

17. The improvement of claim 16 wherein said second motion producing means further comprises:

the first of said plurality of cam faces corresponding to said tape head positioned in the second track of said tape, and each succeeding cam face corresponds sequentially to said tape head positioned at sequentially succeeding tracks of said tape.

18. The improvement of claim 17 wherein said second motion producing means further comprises:

the second and each succeeding cam face comprises substantially equal cam arcuate angles around said preselected axis; and the first cam face comprises approximately twice said equal cam arcuate angles;

the first and each successive ratchet tooth is spaced substantially an equal ratchet arcuate angle from the proceeding tooth, and the last tooth is spaced substantially twice said equal ratchet angle from said first tooth;

second resilient means for yieldingly urging said cam follower into said engagement with said cam faces;

said cam follower is adjustably mounted with respect to said cam face to vary the force exercized by said second resilient means.

19. The improvement of claim 1 and further comprising:

limit means adjustably mounted adjacent said tape head for limiting the movement thereof.

* * * * *